(12) United States Patent
Eskilsson

(10) Patent No.: US 10,754,663 B2
(45) Date of Patent: *Aug. 25, 2020

(54) DYNAMIC DETERMINATION OF HARDWARE

(71) Applicant: Tobii AB, Danderyd (SE)

(72) Inventor: Henrik Eskilsson, Danderyd (SE)

(73) Assignee: Tobii AB, Danderyd (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/959,794

(22) Filed: Apr. 23, 2018

(65) Prior Publication Data

US 2019/0121651 A1    Apr. 25, 2019

Related U.S. Application Data

(63) Continuation of application No. 14/819,163, filed on Aug. 5, 2015, now Pat. No. 9,952,883.

(60) Provisional application No. 62/033,540, filed on Aug. 5, 2014.

(51) Int. Cl.
   *G06F 11/30* (2006.01)
   *G06F 9/445* (2018.01)

(52) U.S. Cl.
   CPC ...... *G06F 9/44505* (2013.01); *G06F 11/3024* (2013.01); *G06F 11/3051* (2013.01)

(58) Field of Classification Search
   CPC ............. G06F 9/44505; G06F 11/3024; G06F 11/3051
   See application file for complete search history.

(56) References Cited

U.S. PATENT DOCUMENTS

| 5,961,642 | A | * | 10/1999 | Lewis | ................ | G06F 9/44505 |
| | | | | | | 709/221 |
| 6,981,135 | B1 | * | 12/2005 | Trask | .................. | G06F 9/44505 |
| | | | | | | 713/1 |
| 2004/0193491 | A1 | | 9/2004 | Davis | | |
| 2005/0021400 | A1 | | 1/2005 | Postrel | | |
| 2014/0139532 | A1 | * | 5/2014 | Sandmel | ............... | G06T 15/005 |
| | | | | | | 345/502 |

OTHER PUBLICATIONS

U.S. Appl. No. 14/189,163, filed Feb. 25, 2014, Non-Final Rejection dated Jun. 12, 2015, all pages.
U.S. Appl. No. 14/189,163, filed Feb. 25, 2014, Final Rejection dated Jan. 12, 2016, all pages.
U.S. Appl. No. 14/189,163, filed Feb. 25, 2014, Non-Final Rejection dated Apr. 1, 2016, all pages.
U.S. Appl. No. 14/189,163, filed Feb. 25, 2014, Final Rejection dated Nov. 17, 2016, all pages.

* cited by examiner

*Primary Examiner* — Jaweed A Abbaszadeh
*Assistant Examiner* — Gayathri Sampath
(74) *Attorney, Agent, or Firm* — Samuel Yamron

(57) ABSTRACT

According to the invention, a method for determining what hardware components are installed on a computing device is disclosed. The method may include identifying the computing device, and determining, based on the computing device, a hardware component of the computing device. The method may also include retrieving information about the hardware component, and setting, based at least in part on the information about the hardware component, a parameter for an algorithm of software on the computing device.

13 Claims, 4 Drawing Sheets

| Computing Device | CD ID | Hardware Component | HW ID | Characteristics | Parameters |
|---|---|---|---|---|---|
| Personal Computer | PC123 | Camera | C456 | Location ABC Capabilities GHI | Parameter Set DEF |
| Personal Computer | PC123 | Eye Tracker | ET789 | Location JKL Capabilities MNO | Parameter Set PQR |
| Laptop/ Notebook | LN123 | Camera | C789 | Location STU Capabilities WXY | Parameter Set ABC |
| Laptop/ Notebook | LN123 | Touchpad | TP456 | Location DEF Capabilities GHI | Parameter Set JKL |
| Tablet | T123 | Camera | C123 | Location MNO Capabilities PQR | Parameter Set STU |
| Tablet | T123 | Illuminator | ILL456 | Location WXY Capabilities ABC | Parameter Set DEF |
| Mobile Phone | MP123 | Camera | C123 | Location GHI Capabilities JKL | Parameter Set MNO |
| Mobile Phone | MP123 | NIR Illuminator | NIL456 | Location PQR Capabilities STU | Parameter Set VWX |
| Mobile Phone | MP123 | Display Screen | DS789 | Location ABC Capabilities DEF | Parameter Set GEF |

Fig. 2

DYNAMIC DETERMINATION OF HARDWARE

CROSS-REFERENCE TO RELATED APPLICATIONS

This application is a continuation of Non-Provisional U.S. patent application Ser. No. 14/819,163 filed Aug. 5, 2015, which claims priority to Provisional U.S. patent application Ser. No. 62/033,540 filed Aug. 5, 2014, the entire disclosures of which are hereby incorporated by reference, for all purposes, as if fully set forth herein.

BACKGROUND OF THE INVENTION

This invention relates generally to determining hardware associated with a computing device. More specifically, the invention relates to determining the characteristics of such hardware so that software on the computing device can use such hardware in a more effective manner.

BRIEF DESCRIPTION OF THE INVENTION

In one embodiment, a method for determining what hardware components are installed on a computing device is provided. The method may include identifying the computing device, and determining, based on the computing device, a hardware component of the computing device. The method may also include retrieving information about the hardware component, and setting, based at least in part on the information about the hardware component, a parameter for an algorithm of software on the computing device.

In another embodiment, a non-transitory machine readable medium having instructions thereon for determining what hardware components are installed on a computing device is provided. The instructions may be executable by one or more processors for identifying the computing device, and determining, based on the computing device, a hardware component of the computing device. The instructions may also be executable for retrieving information about the hardware component, and setting, based at least in part on the information about the hardware component, a parameter for an algorithm of software on the computing device.

In another embodiment, a system for determining what hardware components are installed on a computing device is provided. The system may include one or more processors. The processor(s) may be for identifying the computing device, and determining, based on the computing device, a hardware component of the computing device. The processor(s) may also be for retrieving information about the hardware component, and setting, based at least in part on the information about the hardware component, a parameter for an algorithm of software on the computing device.

BRIEF DESCRIPTION OF THE DRAWINGS

The present invention is described in conjunction with the appended figures:

FIG. 2 is an example database possibly employed by the systems of FIG. 1;

Figure 1:
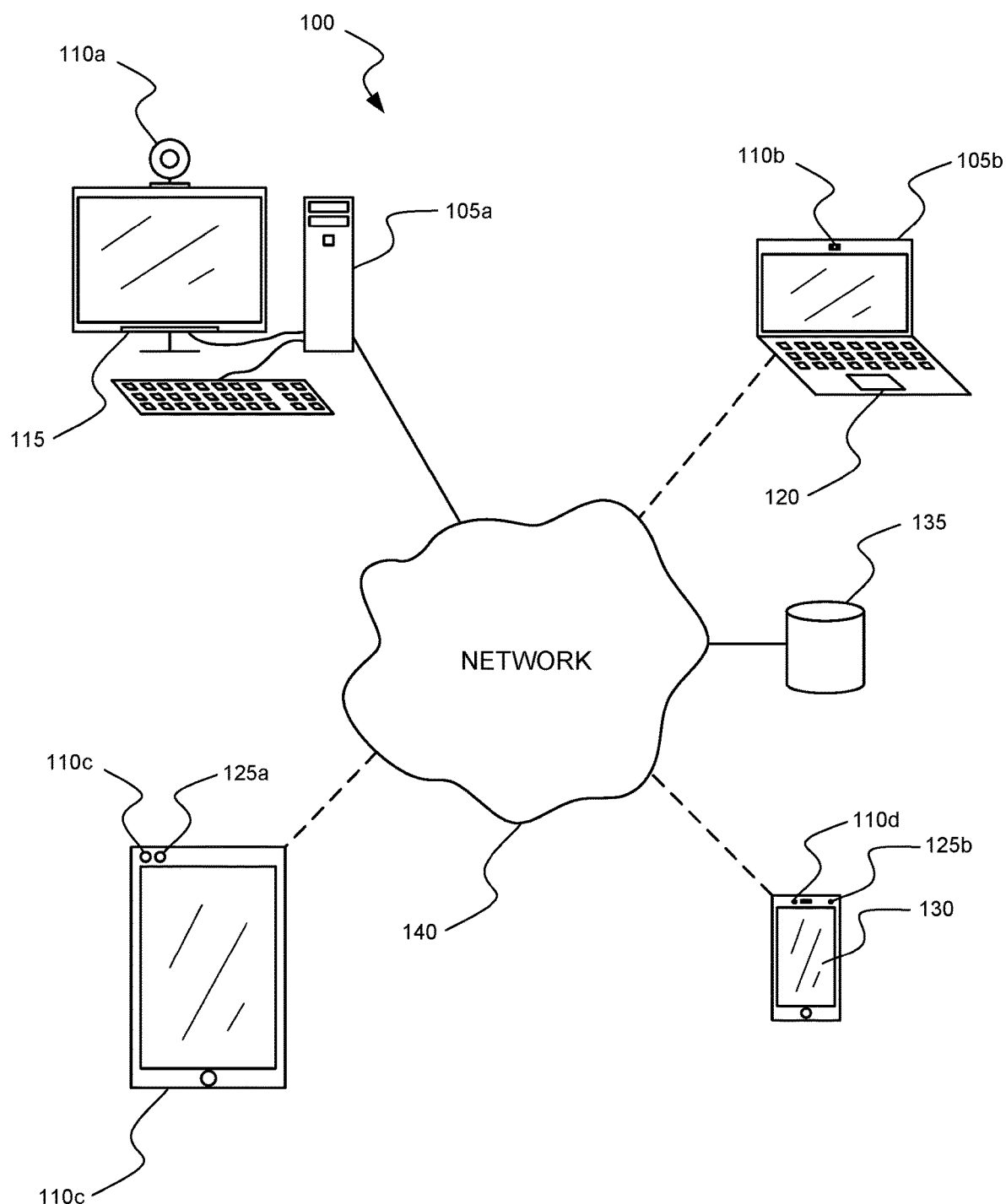
FIG. 1 is a diagram representing one possible environment of various embodiments of the invention.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

For example, any detail discussed with regard to one embodiment may or may not be present in all contemplated versions of that embodiment. Likewise, any detail discussed with regard to one embodiment may or may not be present in all contemplated versions of other embodiments discussed herein. Finally, the absence of discussion of any detail with regard to embodiment herein shall be an implicit recognition that such detail may or may not be present in any version of any embodiment discussed herein.

Specific details are given in the following description to provide a thorough understanding of the embodiments. However, it will be understood by one of ordinary skill in the art that the embodiments may be practiced without these specific details. For example, circuits, systems, networks, processes, and other elements in the invention may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

The term "machine-readable medium" includes, but is not limited to transitory and non-transitory, portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Turning now to FIG. 1, a diagram representing one possible environment 100 of various embodiments of the invention is shown. In this embodiment, multiple potential computing devices 105 may employ various methods of the invention.

Environment 100 may include a personal computer 105a having hardware components such as camera 110a and eye tracking device 115. Personal computer 105a may also have other hardware components such as a display screen, tactile input devices, and other hardware components, shown and not shown in FIG. 1.

Environment 100 may also include a laptop or notebook computer 105b having hardware components such as camera 110b and touchpad 120. Laptop or notebook computer 105b may also have other hardware components such as a display screen, tactile input devices, and other hardware components, shown and not shown in FIG. 1.

Environment 100 may also include a tablet computer 105c having hardware components such as camera 110c, and near infrared or other illuminator 125a. Tablet computer 105c may also have other hardware components such as a display screen, touch screen input devices and other hardware components, shown and not shown in FIG. 1.

Environment 100 may also include a mobile phone 105d having hardware components such as camera 110d, near infrared or other illuminator 125b, and display screen 130. Mobile phone 105d may also have other hardware components such as touch screen input devices and other hardware components, shown and not shown in FIG. 1.

In environment 100, each of computing devices 110 may be in wired or wireless communication with a remote database 135 via a local or wide area network 140. Database 140 may contain such information as is shown in FIG. 2.

FIG. 2 shows the contents of database 135 in greater detail. Database 135 may include information regarding what hardware components are present on a particular computing device 105. It may also include identifiers for each computing device 105 and hardware component to facilitate lookup of each. Database 135 may also include characteristic information on particular hardware components, including, merely by way of example, location information on where on computing device 105 the hardware component is located, as well as capability information regarding the hardware component.

Database 135 may also include parameter information for software that may employ the capabilities of a hardware component. For example, parameters may be stored in database 135 for a hardware component so that a computing device 105 may use such parameters in operating a certain hardware component. In some embodiments, parameters may not be stored for one or more hardware components, and instead a computing device 105 may determine such parameters based on the capabilities and/or identifying characteristics of a hardware component.

Figure 3:
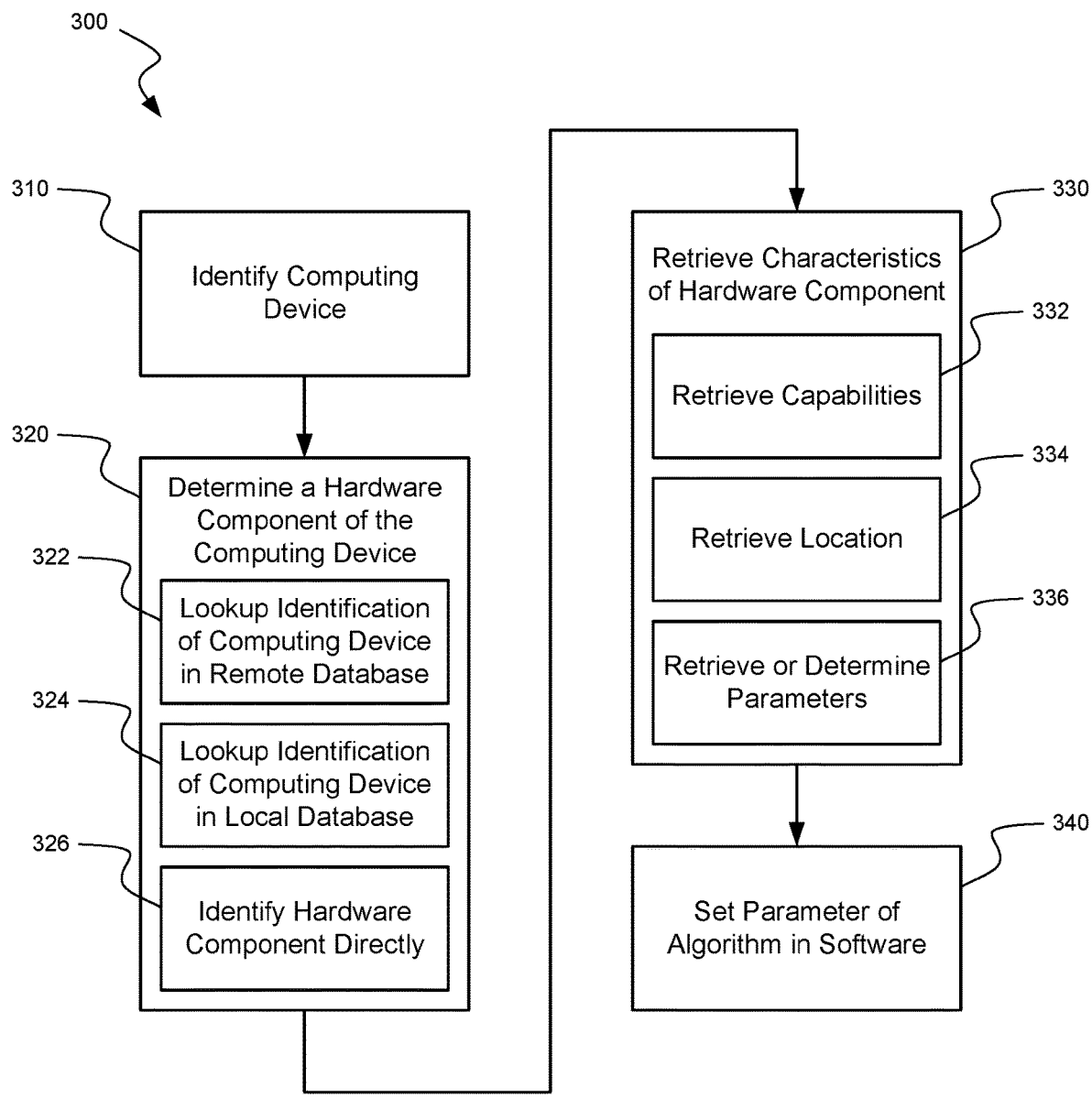
FIG. 3 is a flow diagram of one method of the invention.

FIG. 3 shows a flow diagram of one method 300 of the invention. At block 310, the computing device may be identified. This may be done via determining an identifying string or other data (for example, a vendor ID or product ID) associated with the computing device.

At block 320, the identification of the computing device may be used to determine one or more hardware components present with or installed to the computing device. This may be done either by looking up the identification of the computing device in a local database (block 322) or a remote database (324). In some embodiments, the method, at block 326, may directly determine that a hardware component is present and obtain identifying information (a string or other data (for example, a vendor ID or product ID)) directly from the hardware component or the computing device.

Once one or more hardware components on the computing device have been identified, characteristics of the hardware components may be obtained by reference to the local/remote database at block 330. This may include retrieving capabilities of the hardware component at block 332, and/or location information at block 334.

The capabilities of hardware components may include any operating characteristic of such device. For example, characteristics of a camera may include resolution, exposure, zoom, field of view, color capability, pixel size, shutter types, spectral range, region of interest, read out speed, etc. By further example, characteristics of an eye tracking device may include frequency of readings, resolution, range, etc. In another example, characteristics of illuminators and display screens may be frequency, brightness, type of illumination, beam shaping, coating, etc. Characteristics of touchpads or other tactile input devices may include sensitivity, range, etc. Location information of a hardware component on a computing device may include information which identifies the location of the hardware component relative to other features or hardware components of the computing device.

In some embodiments, at block 336 parameters associated with such characteristics (i.e., capabilities and locations), and usable by a particular software package (for example, eye tracking software, gesture detection software, head movement detection software, image/video capture software, etc.), may either be determined from such characteristic information, or also retrieved from a local or remote database (as shown in FIG. 2). In some embodiments, such particular software package may provide information necessary to determine parameters from the characteristic information. At block 340, the determined/referenced parameters may be used to set parameters of the aforementioned software package. In this manner, devices may be used for functions not originally intended if their capabilities are sufficient for the software package to use as such. For example, a camera and illumination device on a laptop/notebook computer could be used for eye tracking by an eye tracking software package even though a dedicated eye tracking hardware component is not present.

In some embodiments, the method may determine that a computing device is not present in the database once referenced. In these scenarios, the method may determine what hardware is present on the computing device, the location and/or capabilities of such hardware, and update the database with this information. Identification strings of such computing devices and hardware components may also be determined by the method. In some embodiments, the computing device may be correctly identified, but additional hardware components may be present which are not described by the database. In these situations, the hardware components and their location/capabilities may be added to the database to be associated with the computing device. The method may have algorithms for determining locations/capabilities of hardware components, or may query the user of the computing device to determine such. In some embodiments, separate databases or recent new computing devices and/or hardware components may be referenced to update the primary database.

Figure 4:
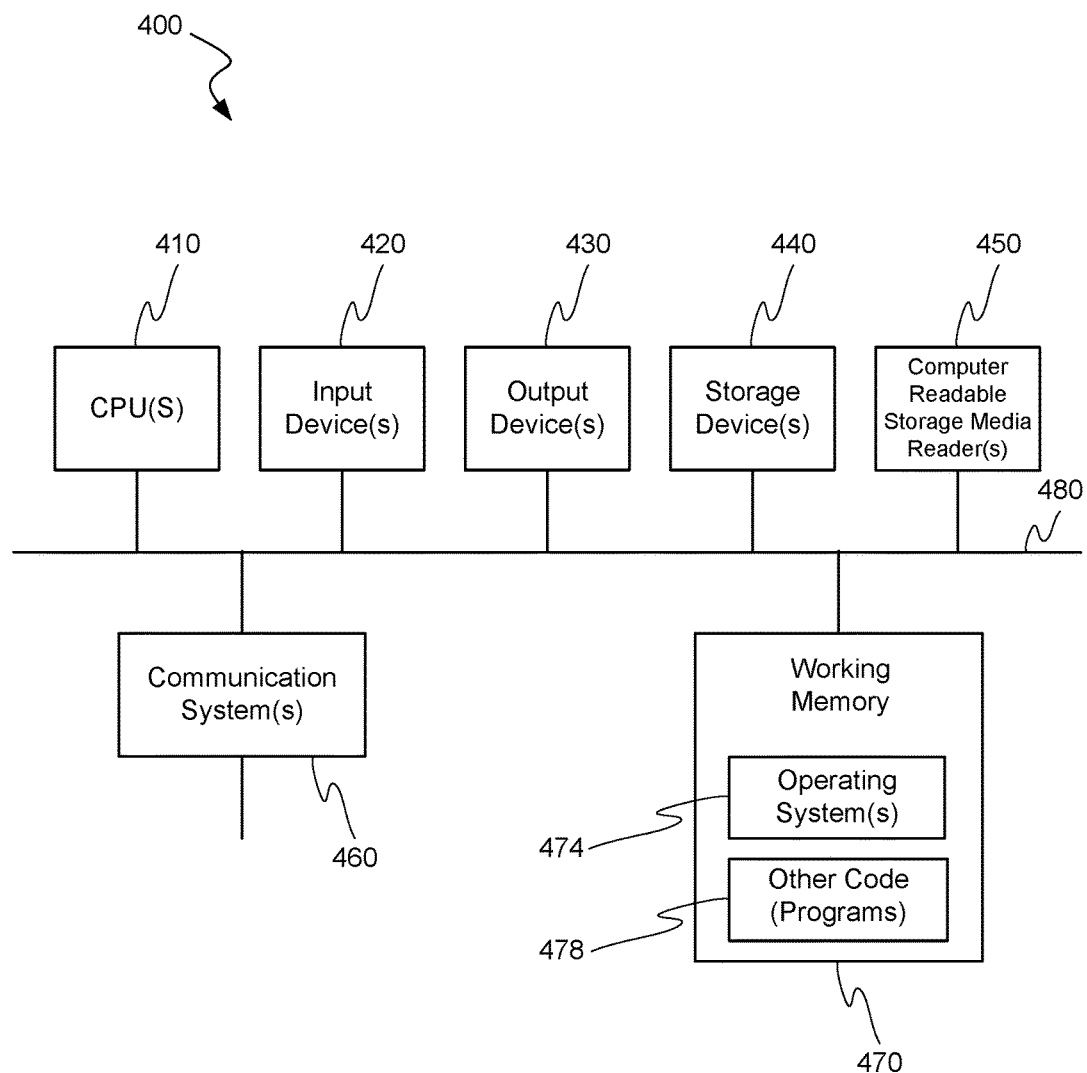
FIG. 4 is a block diagram of an exemplary computer system capable of being used in at least some portion of the apparatuses or systems of the present invention, or implementing at least some portion of the methods of the present invention.

FIG. 4 is a block diagram illustrating an exemplary computer system 400 in which embodiments of the present invention may be implemented. This example illustrates a computer system 400 such as may be used, in whole, in part, or with various modifications, to provide the functions of the software, hardware, methods, and/or other components of the invention such as those discussed above. For example, various functions of software implementing the invention may be controlled by the computer system 400, including, merely by way of example, identifying a computing device, determining hardware components of computing devices, retrieving information about a hardware component, and setting an algorithm of an algorithm of software which may use such devices, etc.

The computer system 400 is shown comprising hardware elements that may be electrically coupled via a bus 490. The hardware elements may include one or more central processing units 410, one or more input devices 420 (e.g., a mouse, a keyboard, etc.), and one or more output devices 430 (e.g., a display device, a printer, etc.). The computer system 400 may also include one or more storage device 440. By way of example, storage device(s) 440 may be disk drives, optical storage devices, solid-state storage device such as a random access memory ("RAM") and/or a read-only memory ("ROM"), which can be programmable, flash-updateable and/or the like.

The computer system 400 may additionally include a computer-readable storage media reader 450, a communications system 460 (e.g., a modem, a network card (wireless or wired), an infra-red communication device, Bluetooth™ device, cellular communication device, etc.), and working memory 480, which may include RAM and ROM devices as described above. In some embodiments, the computer system 400 may also include a processing acceleration unit 470, which can include a digital signal processor, a special-purpose processor and/or the like.

The computer-readable storage media reader 450 can further be connected to a computer-readable storage medium, together (and, optionally, in combination with storage device(s) 440) comprehensively representing remote, local, fixed, and/or removable storage devices plus storage media for temporarily and/or more permanently containing computer-readable information. The communications system 460 may permit data to be exchanged with a network, system, computer and/or other component described above.

The computer system 400 may also comprise software elements, shown as being currently located within a working memory 480, including an operating system 484 and/or other code 488. It should be appreciated that alternate embodiments of a computer system 400 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of computer system 400 may include code 488 for implementing any or all of the function of the various elements of the architecture as described herein. For example, software, stored on and/or executed by a computer system such as system 400, can provide the functions of the software, and/or other components of the invention such as those discussed above. Methods implementable by software on some of these components have been discussed above in more detail.

The invention has now been described in detail for the purposes of clarity and understanding. However, it will be appreciated that certain changes and modifications may be practiced within the scope of the appended claims.

What is claimed is:

1. A method for determining what hardware components are installed on a computing device, the method comprising:
   determining an identifier of a computing device, wherein the computing device is configured with an eye tracking software package configured to use a dedicated eye tracking hardware component for eye tracking;
   determining, based on the identifier of the computing device, to determine hardware components present in the computing device;
   determining that the dedicated eye tracking hardware component is not present in the computing device but that a camera component is present in the computing device;
   in response to determining that the camera component is present, retrieving from a database information about the camera component, wherein the information comprises operating characteristics of the camera component and a location of the camera component relative to other hardware components of the computing device;
   determining, based on the information about the camera component, whether capabilities of the camera component are sufficient for use by the eye tracking software package for eye tracking; and
   based on a determination that the capabilities of the camera component are sufficient, configuring the eye tracking software package to use the camera component for eye tracking.

2. The method for determining what hardware components are installed on a computing device of claim 1, wherein the computing device is a selection from a group consisting of: a personal computer; a laptop computer; a notebook computer; a tablet computer; and a mobile phone.

3. The method for determining what hardware components are installed on a computing device of claim 1, wherein the database is a local database of computing devices which identifies hardware components of different computing devices.

4. The method for determining what hardware components are installed on a computing device of claim 1, wherein the database is a remote database of computing devices which identifies hardware components of different computing devices.

5. The method for determining what hardware components are installed on a computing device of claim 1, wherein retrieving information about the camera component comprises: retrieving at least one parameter corresponding to the at least one camera component; and wherein configuring the eye tracking software package comprises configuring the eye tracking software package based on the at least one parameter.

6. A non-transitory machine readable medium having instructions thereon for determining what hardware components are installed on a computing device, the instructions executable by one or more processors for at least:
   determining an identifier of a computing device, wherein the computing device is configured with an eye tracking software package configured to use a dedicated eye tracking hardware component for eye tracking;
   determining, based on the identifier of the computing device, to determine hardware components present in the computing device;
   determining that the dedicated eye tracking hardware component is not present in the computing device but that a camera component is present in the computing device;
   in response to determining that the camera component is present, retrieving from a database information about the camera component, wherein the information comprises operating characteristics of the camera component and a location of the camera component relative to other hardware components of the computing device;
   determining, based on the information about the camera component, whether capabilities of the camera component are sufficient for eye tracking with an eye tracking software package; and
   based on a determination that the capabilities of the camera component are sufficient for use by the eye tracking software package for eye tracking, configuring the eye tracking software package to use the camera component for eye tracking.

7. The non-transitory machine readable medium of claim 6, wherein the database is a local database of computing devices which identifies hardware components of different computing devices.

8. The non-transitory machine readable medium of claim 6, wherein retrieving information about the camera component comprises: retrieving at least one parameter corresponding to the at least one camera component; and wherein configuring the eye tracking software package comprises configuring the eye tracking software package based on the at least one parameter.

9. The non-transitory machine readable medium of claim 6, wherein the database is a local database or a remote database of computing devices which identifies hardware components of different computing devices.

10. A system for determining what hardware components are installed on a computing device, wherein the system comprises:
    one or more storage devices with executable instructions stored thereon;
    one or more processors executing the instructions for performing steps comprising:
    determining an identifier of a computing device, wherein the computing device is configured with an eye tracking software package configured to use a dedicated eye tracking hardware component for eye tracking;
    determining, based on the identifier of the computing device, to determine hardware components present in the computing device;
    determining that the dedicated eye tracking hardware component is not present in the computing device but that a camera component is present in the computing device;
    in response to determining that the camera component is present, retrieving from a database information about the camera component, wherein the information comprises operating characteristics of the camera component and a location of the camera component relative to other hardware components of the computing device;
    determining, based on the information about the camera component, whether capabilities of the camera component are sufficient for use by the eye tracking software package; and
    based on a determination that the capabilities of the camera component are sufficient, configuring the eye tracking software package to use the camera component for eye tracking.

11. The system for determining what hardware components are installed on a computing device of claim 10, wherein the database is a local database of computing devices which identifies hardware components of different computing devices.

12. The system for determining what hardware components are installed on a computing device of claim 10, wherein retrieving information about the camera component comprises: retrieving at least one parameter corresponding to the at least one camera component; and wherein configuring the eye tracking software package comprises configuring the eye tracking software package based on the at least one parameter.

13. The system for determining what hardware components are installed on a computing device of claim 10, wherein the database is a remote database of computing devices which identifies hardware components of different computing devices.

* * * * *